(12) United States Patent
Hill et al.

(10) Patent No.: US 9,994,762 B2
(45) Date of Patent: Jun. 12, 2018

(54) METHODS AND COMPOSITIONS FOR STIMULATING THE PRODUCTION OF HYDROCARBONS FROM SUBTERRANEAN FORMATIONS

(71) Applicant: Flotek Chemistry, LLC, Marlow, OK (US)

(72) Inventors: Randal M. Hill, The Woodlands, TX (US); Lakia M. Champagne, The Woodlands, TX (US); Nathan L. Lett, Cypress, TX (US); Maria Elizabeth Green, Conroe, TX (US); Hasnain Saboowala, Houston, TX (US)

(73) Assignee: Flotek Chemistry, LLC, Marlow, OK (US)

( * ) Notice: Subject to any disclaimer, the term of this patent is extended or adjusted under 35 U.S.C. 154(b) by 0 days. days.

(21) Appl. No.: 14/721,155

(22) Filed: May 26, 2015

(65) Prior Publication Data

US 2015/0252249 A1    Sep. 10, 2015

Related U.S. Application Data

(63) Continuation of application No. 13/829,434, filed on Mar. 14, 2013, now Pat. No. 9,068,108.

(51) Int. Cl.
    *C09K 8/60* (2006.01)
    *C09K 8/86* (2006.01)
    *C09K 8/68* (2006.01)

(52) U.S. Cl.
    CPC ............ *C09K 8/602* (2013.01); *C09K 8/68* (2013.01); *C09K 8/86* (2013.01)

(58) Field of Classification Search
    None
    See application file for complete search history.

(56) References Cited

U.S. PATENT DOCUMENTS

| | | |
|---|---|---|
| 3,060,210 A | 4/1961 | De Groote |
| 3,047,062 A | 7/1962 | Meadors |
| 3,347,789 A | 10/1967 | Dickson et al. |
| 3,368,624 A | 2/1968 | Heuer et al. |
| 3,483,923 A | 12/1969 | Darley |
| 3,710,865 A | 1/1973 | Kiel |

(Continued)

FOREIGN PATENT DOCUMENTS

| | | |
|---|---|---|
| CN | 102127414 A | 7/2011 |
| CN | 102277143 B | 12/2011 |

(Continued)

OTHER PUBLICATIONS

International Search Report and Written Opinion dated Jul. 30, 2014 for Application No. PCT/US2014/028970.

(Continued)

*Primary Examiner* — Jeffrey Washville
(74) *Attorney, Agent, or Firm* — Wolf, Greenfield & Sacks, P.C.

(57) ABSTRACT

Methods and compositions for stimulating of the production of hydrocarbons (e.g., formation crude oil and/or formation gas) from subterranean formations are provided. In some embodiments, the compositions are emulsions or microemulsions, which may include water, a terpene, and a surfactant. In some embodiments, methods of selecting a composition for treating an oil or gas well are provided.

12 Claims, 1 Drawing Sheet

(56) References Cited

U.S. PATENT DOCUMENTS

| | | |
|---|---|---|
| 3,756,319 A | 9/1973 | Holm et al. |
| 3,760,881 A | 9/1973 | Kiel |
| 3,850,248 A | 11/1974 | Carney |
| 3,919,411 A | 11/1975 | Glass et al. |
| 4,005,020 A | 1/1977 | McCormick |
| 4,206,809 A | 6/1980 | Jones |
| 4,233,165 A | 11/1980 | Salathiel et al. |
| 4,276,935 A | 7/1981 | Hessert et al. |
| 4,360,061 A | 11/1982 | Canter et al. |
| 4,414,128 A | 11/1983 | Goffinet |
| 4,472,291 A | 9/1984 | Rosano |
| 4,511,488 A | 4/1985 | Matta |
| 4,650,000 A | 3/1987 | Andreasson et al. |
| 4,844,756 A | 7/1989 | Forsberg |
| 5,008,026 A | 4/1991 | Gardner et al. |
| 5,034,140 A | 7/1991 | Gardner et al. |
| 5,076,954 A | 12/1991 | Loth et al. |
| 5,083,613 A | 1/1992 | Gregoli et al. |
| 5,095,989 A | 3/1992 | Prukop |
| 5,213,624 A | 5/1993 | Williams |
| 5,217,531 A | 6/1993 | Cheung |
| 5,247,995 A | 9/1993 | Tjon-Joe-Pin et al. |
| 5,310,002 A | 5/1994 | Blauch et al. |
| 5,356,482 A | 10/1994 | Mehta et al. |
| 5,567,675 A | 10/1996 | Romocki |
| 5,587,354 A | 12/1996 | Duncan, Jr. |
| 5,587,357 A | 12/1996 | Rhinesmith |
| 5,604,195 A | 2/1997 | Misselyn et al. |
| 5,652,200 A | 7/1997 | Davies et al. |
| 5,665,689 A | 9/1997 | Durbut |
| 5,676,763 A | 10/1997 | Salisbury et al. |
| 5,697,458 A | 12/1997 | Carney |
| 5,707,940 A | 1/1998 | Bush et al. |
| 5,762,138 A | 6/1998 | Ford et al. |
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | VonKrosigk et al. |
| 7,021,378 B2 | 4/2006 | Prukop |
| 7,122,509 B2 | 10/2006 | Sanner et al. |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,101,812 B2 | 1/2012 | Fan et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |

(56) References Cited

U.S. PATENT DOCUMENTS

| | | |
|---|---|---|
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,068,108 B2 | 6/2015 | Hill et al. |
| 9,102,860 B2 | 8/2015 | Cawiezel et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0232095 A1 | 12/2003 | Garti et al. |
| 2005/0209107 A1 | 9/2005 | Pursley et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0064614 A1 | 3/2008 | Ahrenst et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0078612 A1 | 3/2009 | Fan et al. |
| 2009/0137432 A1 | 5/2009 | Sullivan et al. |
| 2009/0159288 A1 | 6/2009 | Horvath Szabo et al. |
| 2009/0200033 A1* | 8/2009 | Kakadjian ........... B01F 17/0085 166/305.1 |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2009/0325826 A1 | 12/2009 | Quintero et al. |
| 2010/0022421 A1 | 1/2010 | Gutierrez et al. |
| 2010/0173805 A1 | 7/2010 | Pomerleau |
| 2010/0173806 A1* | 7/2010 | Fan ........................ C10G 1/04 507/266 |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0183872 A1 | 7/2011 | Kakadijian et al. |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0035085 A1 | 2/2012 | Parnell et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1* | 6/2013 | Pabalan ............... C11D 1/8255 210/698 |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0274817 A1 | 9/2014 | Hill et al. |
| 2014/0284057 A1 | 9/2014 | Champagne et al. |
| 2014/0332212 A1 | 11/2014 | Ayers et al. |
| 2014/0367107 A1 | 12/2014 | Hill et al. |
| 2015/0053404 A1 | 2/2015 | Penny et al. |
| 2015/0105302 A1 | 4/2015 | Pursley et al. |
| 2015/0247082 A1 | 9/2015 | Rea |
| 2015/0247381 A1 | 9/2015 | Pursley et al. |
| 2015/0329767 A1 | 11/2015 | Vaughn et al. |
| 2016/0003018 A1 | 1/2016 | Saboowala et al. |
| 2016/0017204 A1 | 1/2016 | Hill et al. |
| 2016/0024891 A1 | 1/2016 | Fursdon-Welsh et al. |
| 2016/0032172 A1 | 2/2016 | Pursley et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |

OTHER PUBLICATIONS

[No Author Listed], The HLB system: a time-saving guide to emulsifier selection. ICI Americas Inc. 1976. 22 pages.

ADM, Evolution Chemicals E5789-117 Description. Jun. 2014.

Brost et al., Surfactants assist water-in-oil monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

(56) References Cited

OTHER PUBLICATIONS

Kunieda et al. Evaluation of hydrophile-lipophile balance (HLB) of nonionic surfactants. J Colloid and Interface Sci. Sep. 1985;107(1):107-21.

Leal-Calderon et al., Emulsion Science: Basic Principles, 2 ed. New York, NY: Springer Science + Business Media, LLC., Ch. 1.6. 2007.

Tadros, Emulsion Science and Technology: A General Introduction. Weinheim, Germany: WILEY-VCH Verlag GmbH & Co. Ch. 1.7. 2009.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

\* cited by examiner

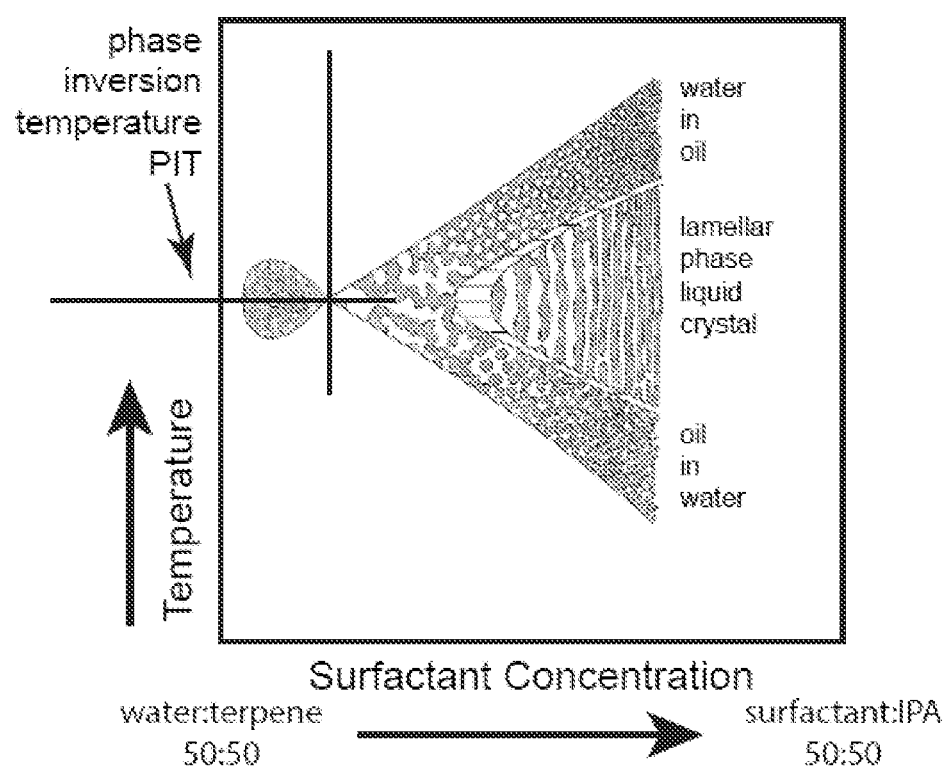

METHODS AND COMPOSITIONS FOR STIMULATING THE PRODUCTION OF HYDROCARBONS FROM SUBTERRANEAN FORMATIONS

RELATED APPLICATIONS

This application is a continuation of U.S. application Ser. No. 13/829,434, filed Mar. 14, 2013, which is incorporated herein by reference in its entirety.

FIELD OF INVENTION

The present invention generally provides methods and compositions for stimulating the production of hydrocarbons (e.g., formation crude oil and/or formation gas) from subterranean formations.

BACKGROUND OF INVENTION

For many years, petroleum has been recovered from subterranean reservoirs through the use of drilled wells and production equipment. During the production of desirable hydrocarbons, such as crude oil and natural gas, a number of other naturally occurring substances may also be encountered within the subterranean environment. The term "stimulation" generally refers to the treatment of geological formations to improve the recovery of liquid hydrocarbons (e.g., formation crude oil and/or formation gas). Common stimulation techniques include well fracturing and acidizing operations.

Oil and natural gas are found in, and produced from, porous and permeable subterranean formations. The porosity and permeability of the formation determine its ability to store hydrocarbons, and the facility with which the hydrocarbons can be extracted from the formation. Hydraulic fracturing is commonly used to stimulate low permeability geological formations to improve the recovery of hydrocarbons. The process can involve suspending chemical agents in a well-treatment fluid (e.g., fracturing fluid) and injecting the fluid down the wellbore. However, the assortment of chemicals pumped down the well can cause damage to the surrounding formation by entering the reservoir rock and blocking the pore throats. It is known that fluid invasion can have a detrimental effect on gas permeability and can impair well productivity. In addition, fluids may become trapped in the formation due to capillary end effects in and around the vicinity of the formation fractures.

In efforts to reduce phase trapping, additives have been incorporated into well-treatment fluids. Generally, the composition of additives comprises multi-component chemical substances and compositions that contain mutually distributed nanodomains of normally immiscible solvents, such as water and hydrocarbon-based organic solvents, stabilized by surfactants (e.g., microemulsions). The incorporation of additives into well-treatment fluids can increase crude oil or formation gas, for example by reducing capillary pressure and/or minimizing capillary end effects.

Although a number of additives are known in the art, there is a continued need for more effective additives for increasing crude oil or formation gas for wellbore remediation, drilling operations, and formation stimulation.

SUMMARY OF INVENTION

Methods and compositions for stimulating the production of hydrocarbons (e.g., formation crude oil and/or formation gas) from subterranean formations are provided.

In some embodiments, methods of selecting a composition for treating an oil or gas well having a wellbore are provided comprising determining whether displacement of residual aqueous treatment fluid by formation crude oil or displacement of residual aqueous treatment fluid by formation gas is preferentially stimulated for the oil or gas well having a wellbore; and selecting an emulsion or a microemulsion for injection into the wellbore to increase formation crude oil or formation gas production by the well, wherein the emulsion or the microemulsion comprises water, a terpene, and a surfactant, the ratio of water to terpene is between about 3:1 and about 1:2; wherein the terpene has a phase inversion temperature greater than 43° C. when displacement of residual aqueous treatment fluid by formation crude oil is preferentially stimulated, or wherein the terpene has a phase inversion temperature less than 43° C. when displacement of residual aqueous treatment fluid by formation gas is preferentially stimulated. In some embodiments, the method further comprises injecting the emulsion or the microemulsion into the wellbore to increase production of formation crude oil or formation gas by the well.

In some embodiments, methods of treating an oil or gas well having a wellbore are provided comprising injecting an emulsion or a microemulsion into the wellbore of the oil or gas well to stimulate displacement of residual aqueous treatment fluid by formation crude oil and increase production of formation crude oil by the well, wherein the emulsion or the microemulsion comprises water, a terpene, and a surfactant; wherein the ratio of water to terpene is between about 3:1 and about 1:2; and wherein the terpene has a phase inversion temperature greater than 43° C.

In some embodiments, methods of treating an oil or gas well having a wellbore are provided comprising injecting an emulsion or a microemulsion into the wellbore of the oil or gas well to stimulate displacement of residual aqueous treatment fluid by formation gas and increase production of formation gas by the well, wherein the emulsion or the microemulsion comprises water, a terpene, and a surfactant; wherein the ratio of water to terpene is between about 3:1 and about 1:2; and wherein the terpene has a phase inversion temperature less than 43° C.

In some embodiments, methods of treating an oil or gas well having a wellbore are provided comprising using an emulsion or a microemulsion to stimulate displacement of residual aqueous treatment fluid by formation crude oil or displacement of residual aqueous treatment fluid by formation gas by injecting the emulsion or the microemulsion into the wellbore of the oil or gas well, and increase production of formation crude oil or formation gas by the well, wherein the emulsion or the microemulsion comprises water, a terpene, and a surfactant; wherein the ratio of water to terpene is between about 10:1 and about 3:1; and wherein the terpene has a phase inversion temperature of greater than 43° C.

In some embodiments, methods of treating an oil or gas well having a wellbore are provided comprising using an emulsion or a microemulsion to stimulate displacement of residual aqueous treatment fluid by oil or displacement of residual aqueous treatment fluid by gas by injecting the emulsion or the microemulsion into the wellbore of the oil or gas well, and increase production of formation crude oil or formation gas by the well, wherein the emulsion or the microemulsion comprises water, a terpene, and a surfactant;

wherein the ratio of water to terpene is between about 10:1 and about 3:1; and wherein the terpene has a phase inversion temperature of less than 43° C.

In some embodiments, an emulsion or a microemulsion for stimulating an oil or gas well is provided comprising an aqueous phase; a surfactant; a freezing point depression agent; and a terpene, wherein the terpene is nopol.

In some embodiments, an emulsion or a microemulsion for stimulating an oil or gas well is provided comprising an aqueous phase; a surfactant; a freezing point depression agent; and a terpene, wherein the terpene is eucalyptol.

Other aspects, embodiments, and features of the invention will become apparent from the following detailed description when considered in conjunction with the accompanying drawings. All patent applications and patents incorporated herein by reference are incorporated by reference in their entirety. In case of conflict, the present specification, including definitions, will control.

BRIEF DESCRIPTION OF THE DRAWINGS

The accompanying drawings are not intended to be drawn to scale. In the drawings, each identical or nearly identical component that is illustrated in various FIGURES is represented by a like numeral. For purposes of clarity, not every component may be labeled in every drawing. In the drawings:

FIG. 1 shows an exemplary plot for determining the phase inversion temperature of a microemulsion, according to some embodiments.

DETAILED DESCRIPTION

The present invention generally relates to methods and well-treatment compositions (e.g., emulsions or microemulsions) for stimulating of the production of liquid hydrocarbons (e.g., formation crude oil and/or formation gas) from subterranean formations. In some embodiments, the compositions comprise an emulsion or a microemulsion, as described in more detail herein. The emulsions or the microemulsions may include water, a terpene, a surfactant, and optionally a freezing point depression agent or other components. In some embodiments, the methods relate to stimulating displacement of residual aqueous treatment fluid by formation crude oil or formation gas to increase production of liquid hydrocarbons, as described in more detail below. In some embodiments, methods of selecting an emulsion or a microemulsion comprising a terpene are provided, wherein the emulsion or the microemulsion is selected so as to increase liquid hydrocarbon production.

As described herein, in some embodiments, the inventors have found that microemulsions or emulsions comprising certain terpenes increase the displacement (e.g., flowback) of residual aqueous treatment fluid by liquid hydrocarbons (e.g., crude oil) as compared to other terpenes. In other embodiments, emulsions or microemulsions comprising certain terpenes increase the displacement of residual aqueous treatment fluid by gaseous hydrocarbons as compared to other terpenes. Laboratory tests may be conducted, as described herein, to determine the displacement of residual aqueous treatment fluid by liquid hydrocarbons and/or gaseous hydrocarbons of an emulsion or a microemulsion Petroleum is generally recovered from subterranean reservoirs through the use of drilled wells and production equipment. Wells are "stimulated" using various treatments (e.g., fracturing, acidizing) of geological formations to improve the recovery of liquid hydrocarbons. Oil and natural gas are found in, and produced from, porous and permeable subterranean formations. Based on techniques known in the art, as well as the preference for the desired product isolated (e.g., formation crude oil or formation gas), it may be preferential to stimulate either crude oil production or gas production from each well. A well drilled into a subterranean formation may penetrate formations containing liquid or gaseous hydrocarbons or both, as well as connate water or brine. The gas-to-oil ratio is termed the GOR. The operator of the well may choose to complete the well in such a way as to produce (for example) predominantly liquid hydrocarbons (crude oil). Alternatively, the operator may be fracturing a tight gas shale formation containing predominantly gaseous hydrocarbons.

Incorporation of the emulsions or the microemulsions described herein (e.g., comprising water, a terpene, and a surfactant) into well-treatment fluids (e.g., fracturing fluids) can aid in reducing fluid trapping, for example, by reducing capillary pressure and/or minimizing capillary end effects. In additional, incorporation of the emulsions or the microemulsions described herein into well-treatment fluids can promote increased flow back of aqueous phases following well treatment, and thus, increase production of liquid and/or gaseous hydrocarbons. That is, incorporation of an emulsion or a microemulsion described herein can aid in the displacement of residual aqueous treatment fluid by formation crude oil and/or formation gas. Residual aqueous treatment fluids may include those fluids employed for fracturing, as well as residual aqueous fluids originally present in the well.

In some embodiments, methods of treating an oil or gas well are provided. In some embodiments, the methods comprise injecting an emulsion or a microemulsion into the wellbore of the oil or gas well to stimulate displacement of residual aqueous treatment fluid by formation crude oil or formation gas, and increase production of liquid hydrocarbons by the well.

In some embodiments, methods are provided for selecting a composition for treating an oil or gas well. The inventors have discovered that certain terpenes are more effective at stimulating displacement of residual aqueous treatment fluid by formation crude oil or displacement of residual aqueous treatment fluid by formation gas for the oil or gas well and that the selection of the terpene may be influenced by the ratio of water to terpene in the emulsion or the microemulsion.

In some embodiments, if displacement of residual aqueous treatment fluid by formation crude oil is preferentially stimulated and the emulsion or the microemulsion comprises water to terpene at a ratio between about 3:1 and about 1:2, then the terpene may be selected to have a phase inversion temperature greater than 43° C., as determined by the method described herein. Alternatively, if displacement of residual aqueous treatment fluid by formation gas is preferentially stimulated and the emulsion or the microemulsion comprises water to terpene at a ratio between about 3:1 and about 1:2, then the terpene may be selected to have a phase inversion temperature less than 43° C., as determined by the method described herein In some embodiments, the ratio of water to terpene is between about 3:1 and about 1:1.5, or between about 2:1 and about 1:1.5.

In some embodiments, to stimulate displacement of residual aqueous treatment fluid by formation crude oil, the ratio of water to terpene in the emulsion or the microemulsion may be between about 3:1 and about 1:2, or between about 2:1 and about 1:1.5, and the terpene may be selected to have a phase inversion temperature greater than 43° C., as determined by the method described herein. In some embodiments, to stimulate displacement of residual aqueous treatment fluid by formation crude oil or formation gas and increase production of formation gas the well, the ratio of water to terpene in the emulsion or the microemulsion may be between about 3:1 and about 1:2, or between about 2:1 and about 1:1.5, and the terpene may be selected to have a phase inversion temperature less than 43° C., as determined by the method described herein.

In some embodiments, to stimulate displacement of residual aqueous treatment fluid by formation crude oil, wherein the ratio of water to terpene in the emulsion or the microemulsion is between about 10:1 and about 3:1, the terpene may be selected to have a phase inversion temperature greater than 43° C., as determined by the method described herein. In some embodiments, to stimulate displacement of residual aqueous treatment fluid by formation gas and increase production of formation gas by the well, wherein the ratio of water to terpene in the emulsion or the microemulsion is between about 10:1 and about 3:1, the terpene may be selected to have a phase inversion temperature less than 43° C., as determined by the method described herein. In some embodiments, the ratio of water to terpene is between about 6:1 and about 5:1.

It should understood, that in embodiments where a microemulsion is said to be injected into a wellbore, that the microemulsion may be diluted and/or combined with other liquid component(s) prior to and/or during injection. For example, in some embodiments, the microemulsion is diluted with an aqueous carrier fluid (e.g., water, brine, sea water, fresh water, or a treatment fluid such as a fracturing fluid comprising polymers, sand, etc.) prior to and/or during injection into the wellbore. In some embodiments, a composition for injecting into a wellbore is provided comprising a microemulsion as described herein and an aqueous carrier fluid, wherein the microemulsion is present in an amount between about 0.1 and about 50 gallons per thousand gallons of dilution fluid ("gpt"), or between about 0.5 and about 10 gpt, or between about 0.5 and about 2 gpt. Generally, dilution of a microemulsion does not result in the breakdown of the microemulsion.

In some embodiments, emulsions or microemulsion are provided. The terms should be understood to include emulsions or microemulsions that have a water continuous phase, or that have an oil continuous phase, or microemulsions that are bicontinuous.

As used herein, the term "emulsion" is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term "microemulsion" is given its ordinary meaning in the art and refers to dispersions of one immiscible liquid in another, in the form of droplets, with diameters approximately in the range of about 10-100 nanometers. Microemulsions are clear or transparent because they contain particles smaller than the wavelength of visible light. In addition, microemulsions are thermodynamically stable and form spontaneously, and thus, differ markedly from thermodynamically unstable emulsions, which generally depend upon intense mixing energy for their formation. The microemulsion may be single phased. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf stability, and (vi) ease of preparation.

It should be understood, that while much of the description herein focuses on microemulsions, this is by no means limiting, and emulsions may be employed where appropriate.

In some embodiments, a microemulsion comprises water, a terpene, and a surfactant. In some embodiments, the microemulsion may further comprise addition components, for example, a freezing point depression agent. Details of each of the components of the microemulsions are described in detail herein. In some embodiments, the components of the microemulsions are selected so as to reduce or eliminate the hazards of the microemulsion to the environment and/or the subterranean reservoirs.

In some embodiments, the microemulsion comprises a terpene. The microemulsion may comprise a single terpene or a combination of two or more terpenes. For example, in some embodiments, the terpene comprises a first type of terpene and a second type of terpene. Terpenes may be generally classified as monoterpenes (e.g., having two isoprene units), sesquiterpenes (e.g., having 3 isoprene units), diterpenes, or the like. In some embodiments, the terpene is a monoterpene. Monoterpenes may be further classified as acyclic, monocyclic, and bicyclic [18-20], as well as whether the monoterpene comprises one or more oxygen atoms (e.g., alcohol groups, ester groups, carbonyl groups, etc.). In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, β-occimene, γ-terpinene, α-pinene, and citronellene. In a particular embodiment, the terpene is selected from the group consisting of α-terpeneol, α-pinene, nopol, and eucalyptol. In one embodiment, the terpene is nopol. In another embodiment, the terpene is eucalyptol. In some embodiments, the terpene is not limonene (e.g., d-limonene). In some embodiments, the emulsion is free of limonene In some embodiments, the terpene may be classified in terms of its phase inversion temperature ("PIT"). The term "phase inversion temperature" is given its ordinary meaning in the art and refers to the temperature where an oil in water microemulsion inverts to a water in oil microemulsion (or vice versa). Those of ordinary skill in the art will be aware of methods for determining the PIT for a microemulsion comprising a terpene (e.g., see Strey, Colloid & Polymer Science, 1994. 272(8): p. 1005-1019; Kahlweit et al., Angewandte Chemie International Edition in English, 1985. 24(8): p. 654-668). The PIT values described herein were determined using a 1:1 ratio of terpene (e.g., one or more terpenes):de-ionized water and varying amounts (e.g., between about 20 wt % and about 60 wt %; generally, between 3 and 9 different amounts are employed) of a 1:1 blend of surfactant comprising linear $C_{12}$-$C_{15}$ alcohol ethoxylates with on average 7 moles of ethylene oxide (e.g., Neodol 25-7):isopropyl alcohol wherein the upper and lower temperature boundaries of the microemulsion region can be determined and a phase diagram may be generated. Those of ordinary skill in the art will recognize that such a phase diagram (e.g., a plot of temperature against surfactant concentration at a constant oil-to-water ratio) may be referred to as "fish" diagram or a Kahlweit plot. The temperature at the vertex is the PIT. An exemplary fish diagram indicating the PIT is shown in FIG. 1. PITs for non-limiting examples of terpenes determined using this experimental procedure outlined above are given in Table 1.

TABLE 1

Phase inversion temperatures for non-limiting examples of terpenes.

| Terpene | Phase Inversion Temperature (° C.) |
|---|---|
| Linalool | −4 |
| Geraniol | −0.5 |
| Nopol | 2.5 |
| α-Terpineol | 4.6 |
| Menthol | 16 |
| Eucalyptol | 31 |
| Menthone | 32 |
| d-Limonene | 43 |
| Terpinolene | 48 |
| β-Occimene | 49 |
| γ-Terpinene | 49 |
| α-Pinene | 57 |
| Citronellene | 58 |

In some embodiments, as described in more detail herein, the terpene has a PIT greater than and/or less than 43° C., as determined by the method described herein. In some embodiments, the terpene has a PIT greater than 43° C., as determined by the method described herein. In some embodiments, the terpene has a PIT less than 43° C., as determined by the method described herein. In some embodiments, the terpene has a PIT greater than 32° C., as determined by the method described herein. In some embodiments, the terpene has a PIT less than 32° C., as determined by the method described herein. In some embodiments, the PIT is between about −10° C. and about 70° C., or between about −4° C. and about 60° C., as determined by the method described herein. In some embodiments, the minimum PIT is −10° C., or −4° C., as determined by the method described herein. In some embodiments, the maximum PIT is 70° C., or 60° C., as determined by the method described herein.

The terpene may be present in the microemulsion in any suitable amount. In some embodiments, terpene is present in an amount between about between about 2 wt % and about 60 wt %, or between about 5 wt % and about 40 wt %, or between about 5 wt % and about 30 wt %, versus the total microemulsion composition.

The water to terpene ratio in a microemulsion may be varied, as described herein. In some embodiments, the ratio of water to terpene, along with other parameters of the terpene (e.g., phase inversion temperature of the terpene) may be varied so that displacement of residual aqueous treatment fluid by formation gas and/or formation crude is preferentially stimulated. In some embodiments, the ratio of water to terpene is between about 3:1 and about 1:2, or between about 2:1 and about 1:1.5. In other embodiments, the ratio of water to terpene is between about 10:1 and about 3:1, or between about 6:1 and about 5:1.

In some embodiments, the microemulsion comprises a surfactant. The microemulsion may comprise a single surfactant or a combination of two or more surfactants. For example, in some embodiments, the surfactant comprises a first type of surfactant and a second type of surfactant. The term "surfactant," as used herein, is given its ordinary meaning in the art and refers to compounds having an amphiphilic structure which gives them a specific affinity for oil/water-type and water/oil-type interfaces which helps the compounds to reduce the free energy of these interfaces and to stabilize the dispersed phase of a microemulsion. The term surfactant encompasses cationic surfactants, anionic surfactants, amphoteric surfactants, nonionic surfactants, zwitterionic surfactants, and mixtures thereof. In some embodiments, the surfactant is a nonionic surfactant. Nonionic surfactants generally do not contain any charges. Amphoteric surfactants generally have both positive and negative charges, however, the net charge of the surfactant can be positive, negative, or neutral, depending on the pH of the solution. Anionic surfactants generally possess a net negative charge. Cationic surfactants generally possess a net positive charge.

Suitable surfactants for use with the compositions and methods described herein will be known in the art. In some embodiments, the surfactant is an alkyl polyglycol ether, for example, having 2-40 ethylene oxide (EO) units and alkyl groups of 4-20 carbon atoms. In some embodiments, the surfactant is an alkylaryl polyglycol ether having 2-40 EO units and 8-20 carbon atoms in the alkyl and aryl groups. In some embodiments, the surfactant is an ethylene oxide/propylene oxide (EO/PO) block copolymer having 8-40 EO or PO units. In some embodiments, the surfactant is a fatty acid polyglycol ester having 6-24 carbon atoms and 2-40 EO units. In some embodiments, the surfactant is a polyglycol ether of hydroxyl-containing triglycerides (e.g., castor oil). In some embodiments, the surfactant is an alkylpolyglycoside of the general formula R″—O—$Z_n$, where R″ denotes a linear or branched, saturated or unsaturated alkyl group having on average 8-24 carbon atoms and $Z_n$ denotes an oligoglycoside group having on average n=1-10 hexose or pentose units or mixtures thereof. In some embodiments, the surfactant is a fatty ester of glycerol, sorbitol, or pentaerythritol. In some embodiments, the surfactant is an amine oxide (e.g., dodecyldimethylamine oxide). In some embodiments, the surfactant is an alkyl sulfate, for example having a chain length of 8-18 carbon atoms, alkyl ether sulfates having 8-18 carbon atoms in the hydrophobic group and 1-40 ethylene oxide (EO) or propylene oxide (PO) units. In some embodiments, the surfactant is a sulfonate, for example, an alkyl sulfonate having 8-18 carbon atoms, an alkylaryl sulfonate having 8-18 carbon atoms, an ester or half ester of sulfosuccinic acid with monohydric alcohols or alkylphenols having 4-15 carbon atoms. In some cases, the alcohol or alkylphenol can also be ethoxylated with 1-40 EO units. In some embodiments, the surfactant is an alkali metal salt or ammonium salt of a carboxylic acid or poly(alkylene glycol) ether carboxylic acid having 8-20 carbon atoms in the alkyl, aryl, alkaryl or aralkyl group and 1-40 EO or PO units. In some embodiments, the surfactant is a partial phosphoric ester or the corresponding alkali metal salt or ammonium salt, e.g. an alkyl and alkaryl phosphate having 8-20 carbon atoms in the organic group, an alkylether phosphate or alkarylether phosphate having 8-20 carbon atoms in the alkyl or alkaryl group and 1-40 EO units. In some embodiments, the surfactant is a salt of primary, secondary, or tertiary fatty amine having 8-24 carbon atoms with acetic acid, sulfuric acid, hydrochloric acid, and phosphoric acid. In some embodiments, the surfactant is a quaternary alkyl- and alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt).

In some embodiments, the surfactant is amphoteric, including sultaines (e.g., cocamidopropyl hydroxysultaine), betaines (e.g., cocamidopropyl betaine), or phosphates (e.g., lecithin). Non-limiting examples of specific surfactants include a linear $C_{12}$-$C_{15}$ ethoxylated alcohols with 5-12 moles of EO, lauryl alcohol ethoxylate with 4-8 moles of EO, nonyl phenol ethoxylate with 5-9 moles of EO, octyl phenol ethoxylate with 5-9 moles of EO, tridecyl alcohol ethoxylate with 5-9 moles of EO, Pluronic® matrix of EO/PO copolymers, ethoxylated cocoamide with 4-8 moles of EO, ethoxylated coco fatty acid with 7-11 moles of EO, and cocoamidopropyl amine oxide.

Those of ordinary skill in the art will be aware of methods and techniques for selecting surfactant for use in the microemulsions described herein. In some cases, the surfactant(s) are matched to and/or optimized for the particular oil or solvent in use. In some embodiments, the surfactant(s) are selected by mapping the phase behavior of the microemulsion and choosing the surfactant(s) that gives the desired range of stability. In some cases, the stability of the microemulsion over a wide range of temperatures is targeting as the microemulsion may be subject to a wide range of temperatures due to the environmental conditions present at the subterranean formation.

The surfactant may be present in the microemulsion in any suitable amount. In some embodiments, the surfactant is present in an amount between about 10 wt % and about 70 wt %, or between about 15 wt % and about 55 wt % versus the total microemulsion composition, or between about 20 wt % and about 50 wt %, versus the total microemulsion composition.

In some embodiments, the microemulsion comprises a freezing point depression agent. The microemulsion may comprise a single freezing point depression agent or a combination of two or more freezing point depression agent. For example, in some embodiments, the freezing point depression agent comprises a first type of freezing point depression agent and a second type of freezing point depression agent. The term "freezing point depression agent" is given its ordinary meaning in the art and refers to a compound which is added to a solution to reduce the freezing point of the solution. That is, a solution comprising the freezing point depression agent has a lower freezing point as compared to an essentially identical solution not comprising the freezing point depression agent. Those of ordinary skill in the art will be aware of suitable freezing point depression agents for use in the microemulsions described herein. Non-limiting examples of freezing point depression agents include primary, secondary, and tertiary alcohols with between 1 and 20 carbon atoms. In some embodiments, the alcohol comprises at least 2 carbon atoms, alkylene glycols including polyalkylene glycols, and salts. Non-limiting examples of alcohols include methanol, ethanol, i-propanol, n-propanol, t-butanol, n-butanol, n-pentanol, n-hexanol, and 2-ethyl-hexanol. In some embodiments, the freezing point depression agent is not methanol (e.g., due to toxicity). Non-limiting examples of alkylene glycols include ethylene glycol (EG), polyethylene glycol (PEG), propylene glycol (PG), and triethylene glycol (TEG). In some embodiments, the freezing point depression agent is not ethylene oxide (e.g., due to toxicity). Non-limiting examples of salts include salts comprising K, Na, Br, Cr, Cr, Cs, or Bi, for example, halides of these metals, including NaCl, KCl, $CaCl_2$, and MgCl. In some embodiments, the freezing point depression agent comprises an alcohol and an alkylene glycol. In some embodiments, the microemulsion comprising the freezing point depression agent is stable over a wide range of temperatures, for example, between about −25° F. to 150° F.

The freezing point depression agent may be present in the microemulsion in any suitable amount. In some embodiments, the freezing point depression agent is present in an amount between about 1 wt % and about 40 wt %, or between about 3 wt % and about 20 wt %, or between about 8 wt % and about 16 wt %, versus the total microemulsion composition.

In some embodiments, the components of the microemulsion and/or the amounts of the components may be selected so that the microemulsion is stable over a wide-range of temperatures. For example, the microemulsion may exhibit stability between about −40° F. and about 300° F., or between about −40° F. and about 150° F. Those of ordinary skill in the art will be aware of methods and techniques for determining the range of stability of the microemulsion. For example, the lower boundary may be determined by the freezing point and the upper boundary may be determined by the cloud point and/or using spectroscopy methods. Stability over a wide range of temperatures may be important in embodiments where the microemulsions are being employed in applications comprising environments wherein the temperature may vary significantly, or may have extreme highs (e.g., desert) or lows (e.g., artic).

The microemulsions described herein may be formed using methods known to those of ordinary skill in the art. In some embodiments, the aqueous and non-aqueous phases may be combined (e.g., the water and the terpene(s)), followed by addition of a surfactant(s) and optionally other components (e.g., freezing point depression agent(s)) and agitation. The strength, type, and length of the agitation may be varied as known in the art depending on various factors including the components of the microemulsion, the quantity of the microemulsion, and the resulting type of microemulsion formed. For example, for small samples, a few seconds of gentle mixing can yield a microemulsion, whereas for larger samples, longer agitation times and/or stronger agitation may be required. Agitation may be provided by any suitable source, for example, a vortex mixer, a stirrer (e.g., magnetic stirrer), etc.

Any suitable method for injecting the microemulsion (e.g., a diluted microemulsion) into a wellbore may be employed. For example, in some embodiments, the microemulsion, optionally diluted, may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the microemulsion for a suitable period of time. The microemulsion and/or other fluids may be removed from the well using known techniques, including producing the well.

In some embodiments, experiments may be carried out to determine displacement of residual aqueous treatment fluid by formation crude oil or formation gas by a microemulsion (e.g., a diluted microemulsion). For example, displacement of residual aqueous treatment fluid by formation crude oil may be determined using the method described in Example 3 and/or displacement of residual aqueous treatment fluid by formation gas may be determined using the method described in Example 2.

These and other aspects of the present invention will be further appreciated upon consideration of the following Examples, which are intended to illustrate certain particular embodiments of the invention but are not intended to limit its scope, as defined by the claims.

EXAMPLES

Example 1

A series of laboratory tests were conducted to characterize the effectiveness of a series of microemulsions incorporating a range of terpenes. For these experiments, samples of a base microemulsion were prepared in which a detergent range alcohol ethoxylate surfactant was first blended in a 1:1 ratio with isopropyl alcohol. Suitable detergent range alcohol ethoxylate surfactants include Neodol 25-7 (obtained from Shell Chemical Co.; e.g., a surfactant comprising linear $C_{12}$-$C_{15}$ alcohol ethoxylates with on average 7 moles of ethylene oxide), or comparable linear and branched alcohol ethoxylate surfactants available from SASOL, Huntsman or Stepan. The examples in Table 2 were prepared using Neodol 25-7. 46 parts by weight of this blend was mixed with 27 parts by weight of terpene and 27 parts by weight of water. Although substantial differences in the microemulsion phase behavior of the different terpenes were observed, this composition was chosen because at this composition, the exemplary terpenes that were tested spontaneously formed transparent stable microemulsions with gentle mixing of the ingredients. Subsequently, 1-2 gallons per thousand (gpt) dilutions were prepared and tested.

A transparent low-viscosity mixture that exhibited the characteristic properties of a microemulsion was prepared using 46% by weight of a blend of Neodol 25-7 and isopropyl alcohol, 27% by weight of water, and 27% by weight of technical grade d-limonene. This mixture was identified as a microemulsion based on the spontaneous formation with minimal mechanical energy input to form a clear dispersion from an immiscible mixture of water and d-limonene upon addition of an appropriate amount of surfactant and co-solvent. The order of mixing of this and other compositions described in this example were not necessary, but for convenience, a procedure was generally followed in which a mixture of the surfactant and the isopropyl alcohol was first prepared then combined that with a mixture of the terpene and water. With small samples, in the laboratory, a few seconds of gentle mixing yielded a transparent dispersion.

The non-limiting terpenes used this example were classified by measuring their phase inversion temperature (PIT) using methods described in the literature (e.g., see Strey, Microemulsion microstructure and interfacial curvature. Colloid & Polymer Science, 1994. 272(8): p. 1005-1019; Kahlweit et al., Phase Behavior of Ternary Systems of the Type $H_2O$-Oil-Nonionic Amphiphile (Microemulsions). Angewandte Chemie International Edition in English, 1985. 24(8): p. 654-668.). As will be known in the art, the PIT measured for a given oil or solvent depends on the surfactant and aqueous phase in which it is measured. In this example, a 1:1 mixture of terpene solvent and de-ionized water was combined with varying amounts of a 1:1 blend of Neodol 25-7 and IPA and the upper and lower temperature boundaries of the one-phase microemulsion region were determined. A phase diagram such as this, plotting temperature against surfactant concentration at a constant oil-to-water ratio is often called a "fish" diagram or a Kahlweit plot. The phase inversion temperature was determined as the point at the "fish-tail" at which the temperature range of one-phase microemulsion closes to a vertex. In this example, the temperature at the vertex was selected as the PIT. An exemplary fish diagram indicating the PIT is shown in FIG. 1. For the terpene solvents used in this example, the PIT values which were measured using this above-described procedure are shown in Table 2. Those terpenes containing alcohol groups (linalool, geraniol, nopol, α-terpineol and menthol), gave PIT values between −4° C. and 16° C. Eucalyptol, containing an ether-oxygen, and menthone, containing a carbonyl oxygen, gave somewhat higher values near 30° C. D-limonene gave 43° C., while other non-oxygen containing terpenes gave values between 48-58° C. As described in more detail below, displacement of residual treatment fluid (containing 1-2 gpt of the microemulsion well treatment) from a sand pack by crude oil or gas was found to correlate to the PIT values.

Table 2 shows results for displacement of residual aqueous treatment fluid by oil and gas for formulations (e.g., using the experimental procedures outlined in Examples 3 and 4) using dilutions of the microemulsions prepared in this example (e.g., the microemulsions comprising 46 parts of 1:1 Neodol 25-7, 27 parts deionized water, and 27 parts terpene solvent). The dilutions were prepared of each microemulsion in 2% KCl, at 2 gpt. The table shows that the terpene solvents with PIT values higher than 43° C. all give approximately 90% recovery, while those below 43° C. give significantly lower recovery. Table 2 also shows displacement by gas results for the dilutions that demonstrates that terpene solvents with PIT values higher than 43° C. give approximately 40% recovery, while those with PIT values below 43° C. give significantly higher recovery.

TABLE 2

PIT values for various terpene solvents (e.g., measured at 1:1 water-oil). Displacement results for 2 gpt dilution of microemulsions comprising 46:27:27 surfactant:water:terpene + isopropanol formulations.

| Terpene | Phase Inversion Temperature (° C.) | % displacement of brine by crude oil | % displacement of brine by gas |
|---|---|---|---|
| Linalool | −4 | — | 81.9 |
| Geraniol | −0.5 | 69.3 | 67.8 |
| Nopol | 2.5 | 80.3 | 58.8 |
| α-Terpineol | 4.6 | 80 | 92.9 |
| Menthol | 16 | 49.7 | — |
| Eucalyptol | 31 | — | 54.6 |
| Menthone | 32 | 79.4 | — |
| d-Limonene | 43 | 89.3 | 45.6 |
| Terpinolene | 48 | 90.5 | 41.8 |
| β-Occimene | 49 | 90.2 | 44.2 |
| γ-Terpinene | 49 | 89 | 32.2 |
| α-Pinene | 57 | 89.9 | 38.7 |
| Citronellene | 58 | 88.2 | 40.5 |

TABLE 3

Oil and Gas displacement results for α-pinene and α-terpineol as a function of surfactant concentration and solvent-to-water ratio.

| Formulation T/S/W* | Terpene | % displacement of brine by crude oil | % displacement of brine by gas |
|---|---|---|---|
| 27-46-27 | α-terpineol | 80 | 92.9 |
| 27-46-27 | α-pinene | 89.9 | 38.7 |
| 21-46-33 | α-terpineol | 88 | 83 |
| 21-46-33 | α-pinene | 87 | 46 |
| 11-46-43 | α-terpineol | 88.5 | 80 |
| 11-46-43 | α-pinene | 96 | 47 |

TABLE 3-continued

Oil and Gas displacement results for α-pinene and α-terpineol as a function of surfactant concentration and solvent-to-water ratio.

| Formulation T/S/W* | Terpene | % displacement of brine by crude oil | % displacement of brine by gas |
|---|---|---|---|
| 15-56-28 | α-terpineol | 87.8 | 85 |
| 15-56-28 | α-pinene | 88.6 | 52 |

*T/S/W stands for terpene weight %/1:1 surfactant-IPA weight %/deionized water wt %

The results shown in Table 3 demonstrate that at a 1:1 ratio of terpene to water, and 46 weight % surfactant-IPA, the high PIT α-pinene performed better on oil displacement and much poorer on gas displacement than the low PIT α-terpineol. As the terpene-to-water ratio decreases from 27-27 to 21-33 to 11-43, the difference in oil displacement performance decreased, then increased again at the lower level. Higher surfactant levels did not substantially increase or decrease the displacement (which may suggest that the microemulsion is performing differently than a surfactant package lacking the terpene solvent). The displacement by gas was better for the low PIT α-terpineol than for the high PIT α-pinene.

Example 2

Microemulsions were prepared having the following formulation, wherein the terpene was varied as indicated in Table 4. The water to terpene ratio was about 5.5:1.
Microemulsion Formulation:

| Water | 27.35 wt % |
|---|---|
| Ethoxylated alcohol surfactant | 52.5 wt % |
| 2-propanol | 8.75 wt % |
| Triethylene Glycol | 3 wt % |
| Propylene Glycol | 3.3 wt % |
| Ethoxylated castor oil | 0.1 wt % |
| Terpene | 5 wt % |

1 gallon per thousand dilutions were prepared of each microemulsion in 2% KCl. The dilutions were then employed to determine the displacement of brine by oil and gas (e.g., using the experimental procedures outlined in Examples 3 and 4). The results are given in Table 4.

TABLE 4

Brine displacement by oil and gas

| Terpene | Effectiveness of brine displacement by gas (%) | Effectiveness of brine displacement by oil (%) |
|---|---|---|
| d-limonene | 79 | 64 |
| α-terpineol | 90 | 88 |
| α-pinene | 86 | 87 |
| geraniol | 87 | 89 |
| linalool | 88 | 87 |
| nopol | 89 | 88 |
| turpentine | 83 | 76 |
| menthol | 82 | 90 |
| eucalyptol | 77 | 90 |
| terpinolene | 79 | 72 |
| β-ocimene | 71 | 68 |
| λ-terpinene | 74 | 60 |
| citronellene | 73 | 88 |

Example 3

This example described a non-limiting experiment for determining displacement of residual aqueous treatment fluid by formation crude oil. A 25 cm long, 2.5 cm diameter capped glass chromatography column was packed with 77 grams of 100 mesh sand. The column was left open on one end and a PTFE insert containing a recessed bottom, 3.2 mm diameter outlet, and nipple was placed into the other end. Prior to placing the insert into the column, a 3 cm diameter filter paper disc (Whatman, #40) was pressed firmly into the recessed bottom of the insert to prevent leakage of 100 mesh sand. A 2" piece of vinyl tubing was placed onto the nipple of the insert and a clamp was fixed in place on the tubing prior to packing. The columns were gravity-packed by pouring approximately 25 grams of the diluted microemulsions (e.g., the microemulsions described in Examples 1 or 2, and diluted with 2% KCl, e.g., to about 2 gpt, or about 1 gpt) into the column followed by a slow, continuous addition of sand. After the last portion of sand had been added and was allowed to settle, the excess of brine was removed from the column so that the level of liquid exactly matched the level of sand. Pore volume in the packed column was calculated as the difference in mass of fluid prior to column packing and after the column had been packed. Three additional pore volumes of brine were passed through the column. After the last pore volume was passed, the level of brine was adjusted exactly to the level of sand bed. Light condensate oil was then added on the top of sand bed to form the 5 cm oil column above the bed. Additional oil was placed into a separatory funnel with a side arm open to an atmosphere. Once the setup was assembled, the clamp was released from the tubing, and timer was started. Throughout the experiment the level of oil was monitored and kept constant at a 5 cm mark above the bed. Oil was added from the separatory funnel as necessary, to ensure this constant level of head in the column. Portions of effluent coming from the column were collected into plastic beakers over a measured time intervals. The amount of fluid was monitored. When both brine and oil were produced from the column, they were separated with a syringe and weighed separately. The experiment was conducted for 3 hours at which the steady-state conditions were typically reached. The cumulative % or aqueous fluid displaced from the column over 120 minute time period, and the steady-state mass flow rate of oil at t=120 min through the column were determined.

Example 4

This example described a non-limiting experiment for determining displacement of residual aqueous treatment fluid by formation gas. A 51 cm long, 2.5 cm inner-diameter capped glass chromatography column was filled with approximately 410±20 g of 20/40 mesh Ottawa sand and the diluted microemulsions (e.g., the microemulsions described in Examples 1 or 2, and diluted with 2% KCl, e.g., to about 2 gpt, or about 1 gpt) To ensure uniform packing, small amounts of proppant were interchanged with small volumes of liquid. Periodically the mixture in the column was homogenized with the help of an electrical hand massager, in order to remove possible air pockets. Sand and brine were added to completely fill the column to the level of the upper cap. The exact amounts of fluid and sand placed in the column were determined in each experiment. The column was oriented vertically and was connected at the bottom to a nitrogen cylinder via a gas flow controller pre-set at a flow rate of 60 cm$^3$/min. The valve at the bottom was slowly opened and liquid exiting the column at the top was collected into a tarred jar placed on a balance. Mass of collected fluid was recorded as a function of time by a computer running a data logging software. The experiments were conducted until no more brine could be displaced from the column. The total % of fluid recovered was then calculated.

Example 5

This examples describes a general preparation method for the production of diluted microemulsion. The microemulsions were prepared in the laboratory by mixing the ingredients listed in specific examples. All ingredients are commercially available materials. In some embodiments, the components were mixed together in the order water-alcohol-surfactant-citrus terpene solvent, but other order of addition may also be employed. The mixtures were then agitated on a magnetic stirrer for 5-10 minutes. The microemulsions were then diluted to concentrations of 1 or 2 gallons per 1000 gallons with 2% KCl brine and these diluted fluids were used in displacement experiments described in Examples 3 and 4.

It will be evident to one skilled in the art that the present disclosure is not limited to the foregoing illustrative examples, and that it can be embodied in other specific forms without departing from the essential attributes thereof. It is therefore desired that the examples be considered in all respects as illustrative and not restrictive, reference being made to the appended claims, rather than to the foregoing examples, and all changes which come within the meaning and range of equivalency of the claims are therefore intended to be embraced therein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element or a list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An emulsion or a microemulsion for stimulating an oil or gas well, comprising:
   an aqueous phase;
   a surfactant;
   a freezing point depression agent; and
   a non-aqueous phase comprising a first type of terpene solvent and a second type of terpene solvent, wherein the first type of terpene solvent is nopol and the second type of terpene solvent is d-limonene.

2. An emulsion or a microemulsion for stimulating an oil or gas well, comprising:
   an aqueous phase;
   a surfactant;
   a freezing point depression agent; and
   an oil continuous phase being a first type of terpene solvent and a second type of terpene solvent, wherein the first type of terpene solvent is nopol and the second type of terpene solvent is d-limonene.

3. The emulsion or the microemulsion of claim 1, wherein the ratio of the aqueous phase to the total amount of terpene solvent is between about 3:1 and about 1:2.

4. The emulsion or the microemulsion of claim 1, wherein the ratio of the aqueous phase to the total amount of terpene solvent is between about 10:1 and about 3:1.

5. The emulsion or the microemulsion of claim 1, wherein the emulsion or the microemulsion comprises a first type of freezing point depression agent and a second type of freezing point depression agent.

6. The emulsion or the microemulsion of claim 1, wherein the freezing point depression agent comprises an alkylene glycol, an alcohol, and/or a salt.

7. The emulsion or the microemulsion of claim 1, wherein the freezing point depression agent is present in an amount between about 5 wt % and about 40 wt % versus the total microemulsion or emulsion.

8. The emulsion or the microemulsion of claim 1, wherein the emulsion or the microemulsion comprises a first type of surfactant and a second type of surfactant.

9. The emulsion or the microemulsion of claim 1, wherein the surfactant is selected from the group consisting of alkyl polyglycol or alkyl polyglucoside nonionic surfactants, or mixtures of said nonionic surfactants with an ionic surfactant comprising anionic, cationic, or zwitterionic surfactants.

10. The emulsion or the microemulsion of claim 1, wherein the surfactant is present in an amount between about 15 wt % and 55 wt % versus the total microemulsion or emulsion.

11. A composition for injecting into a wellbore, comprising:
   an aqueous carrier fluid; and
   the emulsion or a microemulsion as in claim 1, wherein the emulsion or the microemulsion is present in an amount between about 0.1 wt % and about 2 wt % versus the total composition.

12. A composition for injecting into a wellbore, comprising:
   an aqueous carrier fluid; and
   the emulsion or a microemulsion as in claim 2, wherein the emulsion or the microemulsion is present in an amount between about 0.1 wt % and about 2 wt % versus the total composition.

* * * * *